United States Patent [19]

Cadwallader et al.

[11] Patent Number: 5,215,731
[45] Date of Patent: Jun. 1, 1993

[54] PROCESS FOR PREPARING MEDIUM DENSITY GRANULAR SODIUM TRIPOLYPHOSPHATE

[75] Inventors: George W. Cadwallader, Maryland Heights; Louis A. Highfill, Union, both of Mo.

[73] Assignee: Monsanto Company, St. Louis, Mo.

[21] Appl. No.: 865,161

[22] Filed: Apr. 8, 1992

[51] Int. Cl.⁵ ............................................. C01B 25/30
[52] U.S. Cl. .................................................... 423/315
[58] Field of Search ........................................ 423/315

[56] References Cited

U.S. PATENT DOCUMENTS

| | | | |
|---|---|---|---|
| 3,160,472 | 12/1964 | Metcalf et al. | 423/315 |
| 3,338,671 | 8/1967 | Marshall et al. | 423/315 |
| 3,469,938 | 9/1969 | McLeod et al. | 23/107 |
| 3,629,329 | 12/1971 | Shen et al. | 260/534 |
| 3,650,685 | 3/1972 | Dyer et al. | 23/107 |
| 3,761,573 | 9/1973 | Hinz et al. | 423/315 |
| 3,852,212 | 12/1974 | Groening et al. | 252/135 |
| 3,932,590 | 1/1976 | Pals et al. | 423/315 |
| 4,134,963 | 1/1979 | Pals | 423/315 |
| 4,251,498 | 2/1981 | Hensler et al. | 423/315 |
| 4,255,274 | 3/1981 | Hensler | 252/135 |
| 4,315,898 | 2/1982 | Lutz | 423/315 |
| 4,556,525 | 12/1985 | Berglund | 264/8 |
| 4,652,391 | 3/1987 | Balk | 252/99 |
| 4,800,055 | 1/1989 | Klee et al. | 423/315 |
| 5,004,589 | 4/1991 | Cadwallader et al. | 423/315 |
| 5,045,294 | 9/1991 | Highfill | 423/315 |

FOREIGN PATENT DOCUMENTS 1495144 12/1977 United Kingdom .

*Primary Examiner*—Wayne Langel
*Attorney, Agent, or Firm*—R. Loyer

[57] ABSTRACT

A method of producing medium density granular sodium tripolyphosphate by compacting sodium tripolyphosphate fines with dried sodium orthophosphate salt followed by calcining the compacted mixture at a temperature in the range of from about 300° C. to about 600° C.

6 Claims, No Drawings

PROCESS FOR PREPARING MEDIUM DENSITY GRANULAR SODIUM TRIPOLYPHOSPHATE

FIELD OF THE INVENTION

The present invention relates to a method of preparing sodium tripolyphosphate (STP). More particularly, the present invention relates to a method of preparing medium density granular STP from STP fines by compacting the fines in admixture with dried flakes comprising an sodium orthophosphate salt and calcining the compacted fines in accordance with the process of this invention.

BACKGROUND OF THE INVENTION

Most commercially available processes for producing STP produce undesirable fines which cause dusting and difficulties in handling the STP. The fines are typically removed from the larger granules by screening or other methods of separation. The fines are typically not pure STP, and can have up to 20 weight % of other phosphate compounds, such as metaphosphates, pyrophosphates and orthophosphates. The present invention provides a method of utilizing the fines by reprocessing them to produce medium density granular STP.

U.S. Pat. No. 3,160,472 discloses the agglomeration of STP fines by calcining the fines in the presence of at least 10% of blends of certain sodium orthophosphate salts. U.S. Pat. No. 3,761,573 discloses the spraying of fines with an sodium orthophosphate solution to form particles, drying the particles, screening to recover the desired fractions and annealing the recovered particles. U.S. Pat. No. 3,932,590 discloses the spraying of STP fines with a solution of sodium orthophosphates and calcining to produce granular STP. U.S. Pat. No. 4,134,963 discloses the agglomeration of STP fines by spraying with water, then calcining. U.S. Pat. No. 4,251,498 discloses the compaction, milling, moisturizing and calcining of STP fines to agglomerate the fines and produce a granular product. U.S. Pat. No. 3,650,685 discloses the spray drying of an aqueous orthophosphate salt with recycle of fines which are hydrated to a loss on ignition or LOI of between about 18% and 25% by weight and being mixed with the course material from the spray drier. The conditioned feed is converted to granular, low density sodium phosphates at a temperature in the range of from 200° C. to about 500° C. in a fluidized bed. Dense granules of STP are converted to medium density granular STP by means of first moisturizing the STP with water to produce a material having between about 10% and about 30% by weight moisture. The moisturized material is calcined to a temperature within the range of from about 300° C. to about 600° C. to produce a granular STP having low frangibility (friability) and high absorptivity. According to U.S. Pat. No. 4,556,525, spray dried sodium phosphates are agglomerated in a blender as a powder and sprayed with water to 8.4% by weight. The agglomerates are then calcined to provide a medium density polyphosphate.

None of the above patents disclose the present invention of agglomerating STP fines by first compacting the fines in admixture with dried flakes of an sodium orthophosphate, then calcining the compacted material to provide a granular product having a medium range bulk density.

SUMMARY OF THE INVENTION

The present invention is a method of producing medium density granular STP by compacting STP fines in admixture with an sodium salt of orthophosporic acid. The compacted mixture is then calcined at a temperature in the range of from about 450° C. to about 475 ° C. The compacted mixture can be milled and screened to obtain the desired particle size either before or after calcination. The bulk density of the calcined STP is controlled by adjusting the ratio of STP fines and orthophosphate salt in the mixture.

DETAILED DESCRIPTION OF THE INVENTION

In formulating detergent compositions, granular STP has come into widespread use as a phosphate builder which increases the cleaning ability of the detergent compositions. In order for the STP to be useful as a builder, it is necessary for the particle size distribution and the bulk density of the STP be such that the detergent composition formulated with the STP is a free-flowing, essentially homogeneous composition.

The particle size of the granules produced using the present method are typically in the range of 0 to 40% by weight +20 mesh, 15 to 100% by weight $-20+100$ mesh and 1 to 20% by weight $-100$ mesh. All mesh sizes are United States Standard Series. The bulk density of the STP granules produced by the present method is in the range of about 0.7 to 0.85 g/cc, which is considered medium bulk density. This combination of particle size distribution and bulk density typically provides a granular STP with the desired free-flowing, essentially homogeneous composition The frangibility of the granules relates to the particle strength Stronger particles exhibit lower frangibility. Particles of low frangibility are desired to prevent fracturing of particles during mixing, handling and transporting the detergent formulations. Frangibility is determined by placing 100 g of the product on a 100 mesh screen. Three balls, about 2 inches (5.08 cm.) in diameter are placed on the screen The screen is placed on a Ro Tap sieve shaker (manufactrued by W. S. Tyler, Inc.) and shaken for 15 minutes. The amount of material which passed through the 100 mesh screen is weighed, and the % by weight of the sample is calculated. Values below 20% are considered good and below 10% excellent. The product of this invention has demonstrated frangibility well below 10%.

The STP fines used in the present invention are typically a by-product of the process used to produce granular STP. The fines are about 80 to 100% by weight $-100$ mesh.

In accordance with this invention STP fines are fed to a mixing device together with an sodium salt of orthophosphoric acid. Preferably the salt is sodium orthophosphate which has been dried from an aqueous solution such as by means of a drum drier. When a drum dryer is employed the orthophosphate salt is in the form of flakes. The mixing process may be performed by any suitable dry mixing apparatus. After thorough mixing, the mixture is subjected to compaction whereby the STP fines are forced together with the orthophosphate salt. Typically the compaction is carried out by passing the mixture through a pair of steel rollers.

After compaction it is convenient to mill the compacted material to provide the desired particle size. The over sized material can be further milled and the undersized material can be recycled to the compactor. Typically the desired particle size is in the range of from about −14 to +100 mesh. The sized material is then subjected to calcining at a temperature in the range of from about 300° C. to about 600° C. and preferably in the range of from about 450° C. to about 475° C. Calcining converts the orthophosphate into STP and the bulk density is typically in the range of that known in the art as medium bulk density. It has been found that the particle size of the STP calcined product is in the range of that fed to the calciner. Although not preferred, the calcined STP product may be milled and screened to provide the desired particle size as noted above.

The amount of sodium orthophosphate salt mixed with the STP fines affects the bulk density. In general the amount of sodium orthophosphate salt in the STP fines is from about 25% to about 85% by weight. It has been found that bulk density decreases with increasing amount of sodium orthophosphate salt and that medium bulk density is obtained when mixture having the above mentioned amount of orthophosphate salt is processed in accordance with this invention.

The STP product of the process of this invention has been found to possess highly favorable properties with respect to frangibility when measured as noted above.

employed and in run 6 a commercial Model MS-50 compactor sold by Bepex Corporation was used. In runs 1-5 a pressure of 2400 psig was applied to the 5 inch diameter rolls which were 2 inches wide. In run 6 the compactor had 16 inch diameter rolls that were 4 inches wide. hydraulic pressure was applied to the rolls in the range of from 2800-3000 psig or 12.6-14.4 tons of force per inch of roll width.

An aqueous solution of sodium orthophosphate containing 54% by weight solids was fed to a drum dryer to produce dried flakes of the salt. STP fines having a bulk density of 0.73 g/cc were obtained from screening the calciner product. Various blends as indicated in Table I below were provided by blending the dried product in different ratios. After compaction the material was milled and screened to the desired size and then calcined at a temperature in the range of 350° C. to 550° C. Bulk density and frangibility of the calcined product was then determined. As shown by the data in Table 1, calcined product having a medium bulk density is achieved with mixtures having in excess of 20% sodium orthophosphate in the STP fines and frangibility determined as described above improved with increasing amounts of sodium orthophosphate in the compacted material.

TABLE 1

| Run No. | % ORTHO PHOSPHATE IN CALCINER FEED (MIXTURE W/STP FINES) | BULK DENSITY AFTER Compaction | | Frangibility | |
|---|---|---|---|---|---|
| | | BEFORE CALCINATION | AFTER CALCINATION | UNCALCINED | CALCINED |
| 1. | 0 | 0.98 | 1.04 | 22.8 | 8.0 |
| 2. | 10 | — | 0.95 | — | 6.7 |
| 3. | 20 | — | 0.90 | — | 4.8 |
| 4. | 50 | — | 0.86 | — | 2.4 |
| 5. | 70 | — | 0.81 | 12.9 | 2.4 |
| 6. | 50 | — | 0.86 | 3.7 | 1.7 |

While frangibility of less than 10% is termed "excellent", it has been shown that the process of this invention far exceeds even this "excellent" rating. This property is important in recent markets which are demanding fewer fines in the product as delivered.

The moisture content of the compacted material prior to calcining is usually in the range of from about 0% to about 10% by weight and preferably about 2-5% by weight.

The sodium orthophosphate is derived from aqueous solutions containing a mole ratio of sodium to phosphorus in the range of from about 1.5 to about 1.8. The sodium/phosphorus mole ratio is typically in the range of from about 1.6 to about 1.7. The orthophosphate salt solution typically contains from about 50% to about 55% by weight solids.

The compacted mixture is calcined in the usual manner at a temperature in the range of from about 300° C. to about 600° C. to provide a free flowing medium density STP. The fines from this operation can be recycled in accordance with this invention.

The following examples are for illustrative purposes only and are not intended to limit the scope of this invention in any manner. Unless otherwise stated, all percentages are percent by weight in the following examples.

EXAMPLES

In the following examples different compactors were employed. In runs 1-5 a laboratory sized comparator marketed by K. R. Komarek Inc. Model B-100-A was While the above invention has been described in terms of specific embodiments, the invention is not to be limited thereby and other variables and embodiments may be practiced within the scope of the invention.

We claim:

1. A method of producing medium density granular sodium tripolyphosphates comprising compacting a mixture of sodium tripolyphosphate fines with a dried particulate sodium orthophosphate salt, milling said compacted mixture to provide the desired particle size and then calcining the compacted material at a temperature in the range of from about 300° C. to about 600° C.

2. The method of claim 1 wherein said dried particulate orthophosphate salt was obtained from an aqueous solution of an sodium orthophosphate salt containing a solids content in the range of from about 50% to about 55%, by weight.

3. The method of claim 1 wherein said mixture contains from about 25% to about 80% by weight sodium orthophosphate salt.

4. The method of claim 3 wherein said mixture contains from about 50% to about 80% by weight sodium orthophosphate salt.

5. The process of claim 1 wherein the fines obtained when the compacted mixture is milled and screened are recycled to the compactor.

6. The process of claim 1 wherein the calcined product is milled and screened and the fines recycled to the mixture being fed to the compactor.

* * * * *